(12) United States Patent
Reno et al.

(10) Patent No.: US 8,607,041 B2
(45) Date of Patent: Dec. 10, 2013

(54) PERIMETER ENCRYPTION METHOD AND SYSTEM

(75) Inventors: James Donald Reno, Scotts Valley, CA (US); Robert Roy Allen, Marshall, NC (US)

(73) Assignee: Computer Associates Think, Inc., Islandia, NY (US)

( * ) Notice: Subject to any disclaimer, the term of this patent is extended or adjusted under 35 U.S.C. 154(b) by 152 days.

(21) Appl. No.: 13/173,037

(22) Filed: Jun. 30, 2011

(65) Prior Publication Data

US 2012/0017078 A1    Jan. 19, 2012

Related U.S. Application Data

(60) Provisional application No. 61/363,737, filed on Jul. 13, 2010.

(51) Int. Cl.
*H04L 29/06* (2006.01)

(52) U.S. Cl.
USPC ............................................. 713/153; 726/12

(58) Field of Classification Search
USPC ........................ 726/12, 13; 713/151, 153, 154
See application file for complete search history.

(56) References Cited

U.S. PATENT DOCUMENTS

2002/0169954 A1* 11/2002 Bandini et al. ................ 713/153
2006/0184999 A1* 8/2006 Guichard et al. ................ 726/3

* cited by examiner

*Primary Examiner* — Edward Zee
(74) *Attorney, Agent, or Firm* — Quinn Law Group, PLLC

(57) ABSTRACT

A method and system for consistent format preserving encryption (C-FPE) are provided to protect sensitive data while the sensitive data is in a domain while allowing encrypted sensitive data to be treated inside the domain as if it were the unencrypted sensitive data. The method includes inserting a transparent coupling into a data flow at a perimeter of the domain, and translating a sensitive data element from an unprotected data element to a protected data element using the transparent coupling such that the sensitive data element is a protected data element within the domain.

20 Claims, 5 Drawing Sheets

PERIMETER ENCRYPTION METHOD AND SYSTEM

CROSS-REFERENCE TO RELATED APPLICATIONS

This application claims the benefit of U.S. Provisional Patent Application No. 61/363,737, filed on Jul. 13, 2010, which is hereby incorporated by reference in its entirety.

TECHNICAL FIELD

The invention relates generally to the protection of data within a domain.

BACKGROUND

Databases containing sensitive information on systems accessible from the internet or on electronic media have proliferated globally. Protection of sensitive data within a given domain has traditionally been managed by controlling access to the data. This approach is flawed, as demonstrated by many widely publicized incidents when an attacker gains access to the internal system or when the data is moved outside the enclosure, for example, when data on a laptop or disk is stolen. There have been numerous documented events of computer break-ins that compromise sensitive data such as credit card numbers, personal identification and social security numbers, financing and loan information, and medical information.

One way to protect this sensitive data is to encrypt it. But this sensitive data, contained in databases or other persistent mechanisms, is served by processes that make assumptions about the format of various data items, for example credit card numbers and social security numbers that are strings of decimal digits in a certain format, dollar amounts in a certain range, alphabetic strings, dates, and zip codes. In addition, different copies of the data can reside in multiple locations and a given process may require that the data match in these different locations for the process to be performed. Because it is not feasible to revise all existing processes which use the data, it is necessary that any data protection method, for example, an encryption method used to encrypt data contained in a database or other persistent mechanism, must be executed in a way that preserves the format of the data sufficiently such that an existing process using the data will still function and any validity and cross-system checks performed by the process can be performed and passed.

SUMMARY

A method of protecting sensitive data elements within a domain is provided herein. The method includes inserting one or more transparent couplings into a data flow at a perimeter of the domain, such that data flows through at least one coupling when flowing into or out of the domain. The data flow includes one or more data elements which are sensitive data elements. The method further includes translating the sensitive data element from an unprotected data element to a protected data element using a transparent coupling such that the sensitive data element is configured as a protected data element within the domain. The protected data element may be an encrypted element or a token, where the protected data element preserves the syntax and internal semantics of the unprotected form of the sensitive data element. The method further includes consistently translating a sensitive data element into the same protected data element each time the sensitive data element is translated, and translating the sensitive data element into the same protected data element when the sensitive data element enters the domain through any of the one or more transparent couplings.

One or more of the transparent couplings may be configured as a proxy service, where the data flow through a proxy adapter of the service may include protocol messages. The proxy service may identify the sensitive data elements in the protocol messages, and may translate each sensitive element from an unprotected data element to a protected data element, and replace the unprotected sensitive data element in the protocol messages with the protected data element. The proxy service may serve but is not limited to Hypertext Transfer Protocol (HTTP) and/or secure HTTP (HTTPS) protocol.

One or more of the transparent couplings may be configured as a shim application programming interface (API) to replace an external API used by a process within the domain to move data elements into or out of the domain without making coding changes in the caller of the API. The shim API may be configured to identify the sensitive data elements from input arguments, output arguments, input messages and output messages moved into or out of the domain using the shim API, to translate each of the sensitive data elements from an unprotected data element to a protected form, and to replace the unprotected sensitive data element in the input arguments, output arguments, input messages and output messages with the corresponding protected data element.

A system for protecting sensitive data elements within a domain is also provided herein. The system includes a domain including a server configured to receive a data flow, a data flow at a perimeter of the domain which includes one or more sensitive data elements, and one or more transparent couplings inserted into the data flow and configured to translate each sensitive data element from an unprotected data element to a protected data element such that each sensitive data element is configured as a protected data element within the domain. The transparent coupling may be configured as a proxy service or may be configured as a shim API.

The system may further include a protection engine having an access control mechanism defining decision logic as to whether a given request is authorized to be fulfilled, a key management mechanism defining a hardware security module, and an encryption mechanism. The encryption mechanism may be configured to consistently translate an unprotected sensitive data element to a protected form, where the protected data element preserves the syntax and internal semantics of the unprotected sensitive data element, and where the protection engine provides the same protected data element for a given sensitive data element each time the unprotected sensitive data element is translated and regardless of which transparent coupling the given sensitive data element enters the domain through.

The above features and advantages and other features and advantages of the present invention are readily apparent from the following detailed description of the best modes for carrying out the invention when taken in connection with the accompanying drawings.

DETAILED DESCRIPTION

Figure 1:
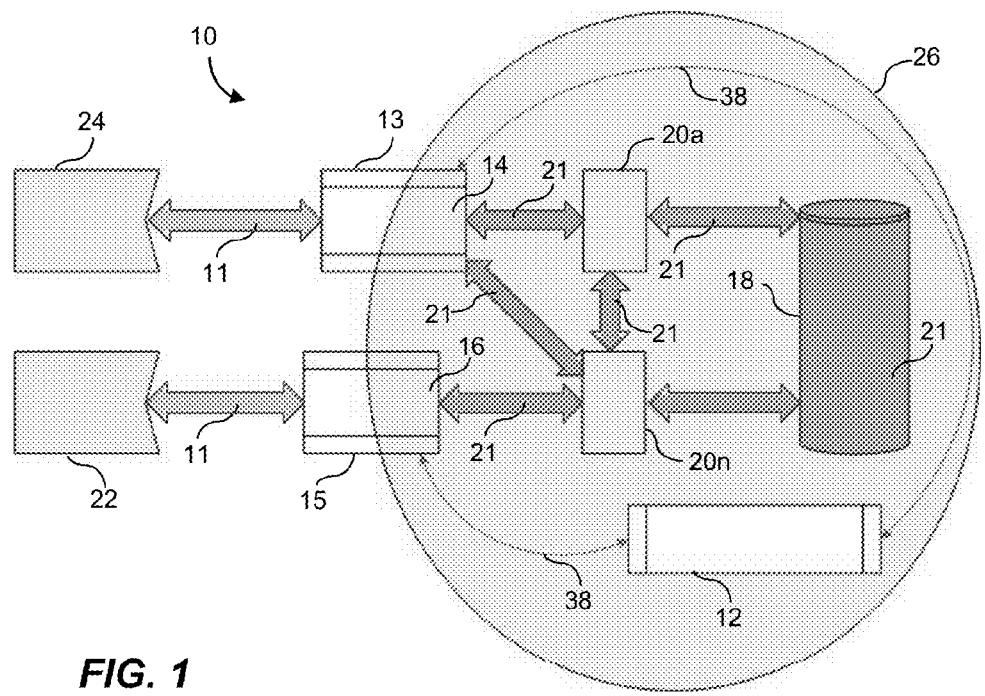
FIG. 1 is a schematic illustration of a network configured with a system of consistent format preserving encryption (C-FPE)

A method and system for consistent format preserving encryption (C-FPE) is provided herein to protect sensitive data within a domain, from the time the sensitive data enters or is input into the domain and until the sensitive data is output from the domain. Included are mechanisms for reversing the protective encryption when the sensitive data is needed to interact with entities outside the domain. Because C-FPE preserves the format, e.g., the syntax and internal semantics of the unprotected or actual data, C-FPE allows encrypted data to be treated and processed inside the domain as if it were the actual unencrypted or unprotected data. Specifically, C-FPE produces a protected or encrypted data element that maintains the original data element's syntax and coherence; where coherence is defined to mean that a given data element, for example a Name, will encrypt to the same element so that the encrypted Name will serve as a reliable identifier, as does the actual Name. As used herein, and when referring to a given sensitive data element, the term "unprotected data element" refers to the given sensitive data element in a form which is not protected by C-FPE. For example, a given sensitive data element may be an "unprotected data element" as inputted to the domain 26 shown in FIG. 1, or as outputted from the domain 26 after being translated from a protected data element corresponding to the given sensitive data element. As used herein, and when referring to a given sensitive data element, the term "protected data element" refers to the given sensitive data element in a form which is protected by C-FPE.

As used herein, the term "internal semantics" refers to the semantics of the C-FPE protected data element of the sensitive data element. The internal semantics are implicitly assigned by the internal entities, e.g., the entities within the domain which are using or processing the protected data element. By using C-FPE to preserve the format and syntax of the data, the C-FPE protected data element will be recognized for internal processing by entities within the domain, and the protected data element will be meaningless, and therefore protected, outside the domain.

C-FPE successfully prevents unauthorized access to and accidental loss of sensitive information where the basic data protection requirement is met by a format preserving encryption (FPE) algorithm. Consistency between systems and over time is provided by a mechanism of centralized key management for the keys used by the FPE algorithm. Therefore, for a given input value, the output value from the FPE process will always be the same output value, each time the input value is translated by the FPE process. Similarly, the same unprotected data element will be translated into a corresponding protected data element, for a given sensitive data element, regardless of the origin of the data element input, e.g., regardless of whether the data element originated from the data flow through a first transparent coupling or another transparent coupling.

Further, the C-FPE system is implemented with mechanisms to change data inflow processes (capturing incoming sensitive data and encrypting it), and to change data outflow processes (providing sensitive data to entities outside the domain in a form that is useful to them). The C-FPE system includes a protection engine which is applied to a given domain perimeter and includes one or more transparent couplings which are inserted into data flows at the domain perimeter. The couplings provide a low-intrusion mechanism for engaging the C-FPE process, further reducing changes needed to data inflow and outflow systems.

Referring to FIG. 1, generally indicated at 10 is a schematic illustration of a C-FPE system configured to protect sensitive data within a data domain 26. The C-FPE system 10 as shown is configured to include at least three elements: a protection engine 12, a transparent coupling 13 using a proxy adapter 14, and a transparent coupling 15 using an application programming interface (API) shim adapter 16. A domain 26 may include a plurality of internal entities generally indicated as 20a . . . 20n, which use or process data within the domain 26 and data incoming and outgoing through the transparent couplings 13, 15. The C-FPE system 10 may further include additional transparent couplings 13, 15, as required by the configuration of the internal entities, such as the internal entities 20a or 20n and the configuration of the domain 26. The C-FPE system 10 and/or the domain 26 may include one or more servers (not shown) configured to receive, use and/or process data incoming and outgoing through the transparent couplings 13, 15. The C-FPE system 10 and/or the domain 26 may include memory (not shown), which may be, by way of example, as Read Only Memory (ROM), Random Access Memory (RAM), electrically-erasable programmable read only memory (EEPROM), etc., i.e., non-transient tangible machine memory of a configuration, size and/or speed sufficient for executing one or more algorithms included in C-FPE system 10, storing one or more data bases, providing a data repository, and/or recording, by way of example, mechanisms, couplings, etc. which may be included in the C-FPE system 10.

As shown in FIG. 1, data with exposed sensitive data elements is exchanged between internal entities, such as, for example, the internal entities 20a and 20n, and external entities, such as the external entities 22, 24. The transparent couplings 13, 15 intercept data incoming to the data domain 26 and process the data using adapters 14, 16 and a protection engine 12 to transform each sensitive data element in the data from an unprotected data element 11 to a protected data element 21 while the data resides in the domain 26. Each sensitive data element in the incoming data is transformed from an unprotected sensitive data element 11 using C-FPE to a protected sensitive data element 21 in a persistent data repository 18 and within data domain 26. Similarly, the transparent couplings 13, 15 intercept data outgoing from the data domain 26 and process the sensitive data elements using the adapters 14, 16 and the protection engine 12 to transform each sensitive data element in the outgoing data from a protected data element 21 to an unprotected data element 11 prior to the data being received or processed by an external entity 22, 24.

As shown in FIG. 1, each of the unprotected data elements 11 incoming to the domain 26 are transformed to a corresponding protected data element 21, and each protected data element 21 may be used by one or more internal entities 20a . . . 20n. The internal entities 20a . . . 20n may receive or transmit the protected data elements 21 from or to another internal entity, from or to a persistent data repository 18, and through any of the transparent couplings 13, 15.

Figure 2:
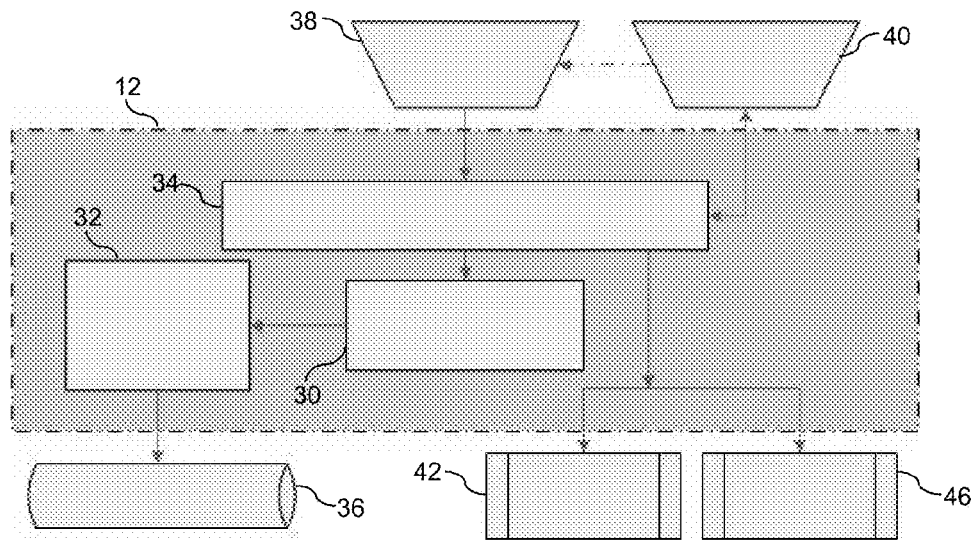
FIG. 2 is a schematic illustration of a protection engine configured for use in the system of FIG. 1.

Referring to FIG. 2, shown is a schematic illustration of one possible embodiment of a protection engine 12 included in the C-FPE system 10 of FIG. 1. In the non-limiting example shown in FIG. 2, the protection engine 12 is configured as a centralized system that includes at least an access control mechanism 34, an FPE mechanism 30 and a key management mechanism 32. The protection engine 12 exposes its services to the transparent couplings 13, 15 of FIG. 1 through a well-defined secure interface.

An access control mechanism 34 is responsible for determining if a request 38 is authorized and should be fulfilled. This determination may be based on the identity of the external entity, such as an entity 22 or 24 of FIG. 1, the identity of the internal entity, such as an entity 20a and 20n of FIG. 1, the configuration of the transparent coupling 13 or 15, the contents of the request 38, other factors such as the context in which the request was made (historic usage patterns, etc), or a combination of these factors. If the access control mechanism 34 is configured to use the identity of the internal or external entities in making its determination, it may be configured to include an authentication service or mechanism 42 to establish those identities, or it may rely on some trusted identity-certifying process outside of the protection engine 12. The authentication mechanism 42 may be configured to support various authentication technologies including cryptographic camouflage, one-time password, Remote Authentication Dial In User Service (RADIUS) protocol, and/or single sign-on/trust delegation mechanisms.

If the access control mechanism 34 is configured to use request context information in making its determination, it may be configured to include a risk evaluation service or mechanism 46. For purposes of making an authorization determination, the access control mechanism 34 may be capable of validating entities' identity tokens and categorizing requests. For example, an entity may be allowed to make requests in the encryption category but may be prohibited from making requests in the decryption category, or an entity may be allowed to decrypt or unprotect only data within a specific category, such as data representing user identifiers which may be needed by the requestor for phone interactions. The risk evaluation mechanism 46 evaluates patterns of requests and evaluates the trustworthiness of a given request. The risk evaluation service 46 supplements the authentication mechanism 42 to protect against risks associated with lost or forged credentials.

When required, initial authentication requests 40 from an external entity, such as an entity 22 or 24 of FIG. 1, or an internal entity, such as an entity 20a or 20n of FIG. 1, are handled by the access control mechanism 34. Each encryption and decryption request 38 is first presented to the access control mechanism 34, and if determined authorized is then passed to the FPE mechanism 30 to be fulfilled. When the identity of the requesting entity is part of the request 38, the access control mechanism 34 verifies an authentication or identity token from the caller or requestor and determines whether the caller/requestor has authorization to perform the given action for the data element(s) included in the request 38.

Still referring to FIG. 2, if the request 38 is an authorized request, then the FPE mechanism 30 uses one or more secret keys accessed from the key management mechanism 32, which may include and/or use a secure domain key repository such as a hardware security module 36 to protect access to the one or more secret keys. The hardware security module 36 may be, for example, a central server (not shown), and access to the central server may be protected using an authentication mechanism, such as or similar to the authentication mechanism 42. The key management mechanism 32 may include a process to create, use and delete keys in the repository. The FPE mechanism 30 may use the keyset to translate the sensitive data inside the domain 26 such that the format syntax and coherence of each sensitive data element of the sensitive data is preserved.

The FPE mechanism 30 includes cryptographic utilities to perform FPE on any enumerated data set, given a set of secret keys. The set of secret keys may consist of one or more keys. The FPE mechanism 30 further includes format definitions that map a given data element to an enumerated data set, and translate a member of the enumerated set back to a data element.

The FPE mechanism 30 may use format definitions pertaining to the data elements included in the request 38 in conjunction with the secret keys accessed from key management mechanism 32 in an FPE encryption process to protect sensitive data received from or provided to an external entity by translating the sensitive data received into, processed by, or stored within the data domain 26 into a protected form, which may be configured as an encrypted data element or a token.

The FPE mechanism 30 may translate a sensitive data element from an unprotected data element 11 to a protected form 21 by representing the sensitive data element with a corresponding token, where the token is a randomly generated token which is randomly generated using a token mapping mechanism. The token is formatted to preserve the format of the unprotected sensitive data element 11, e.g., the token preserves the syntax and internal semantics of the unprotected data element 11. The FPE mechanism 30 is configured to consistently translate a given sensitive data element to the token corresponding to that given data element, using a token mapping mechanism, each time the given data element is presented for translation. Access to the token mapping mechanism may be protected using a central server. Access to the central server may be protected using an authentication mechanism, such as or similar to the authentication mechanism 42.

The protected data element 21 of the sensitive data preserves the format of the unprotected data element 11 of the sensitive data, which may include the syntax, internal semantics and coherence of the unprotected data element 11. As discussed previously, for any given sensitive data element which is input into the protection engine 12, the same output (protected or unprotected data element) will be consistently generated over time, e.g., each time the given sensitive data element is input into the protection engine 12. For example, when the unprotected data element 11 corresponding to the given sensitive data element is input into the protection engine 12, it will be translated into its corresponding protected data element 21, and when the protected data element 21 corresponding to the given sensitive data element is input into the protection engine 12, it will be translated into its corresponding unprotected data element 11. Similarly, the same output will be consistently generated when the given sensitive data element is input to the protection engine 12 from a first transparent coupling, or when the same given sensitive data element is input to the protection engine 12 from another or additional transparent coupling. The same output will be consistently generated when the given sensitive data element is input to the protection engine 12 from a transparent coupling 13 configured as a proxy service 14 and when the same given sensitive data element is input to the protection engine 12 from a transparent coupling 15 configured as a shim API 16. Because the same output will be consistently provided each time a given input element is presented for translation to the FPE mechanism 30, and because the format of the input element is the same as the format of the output element, the process described herein is referred to as C-FPE.

Figure 3:
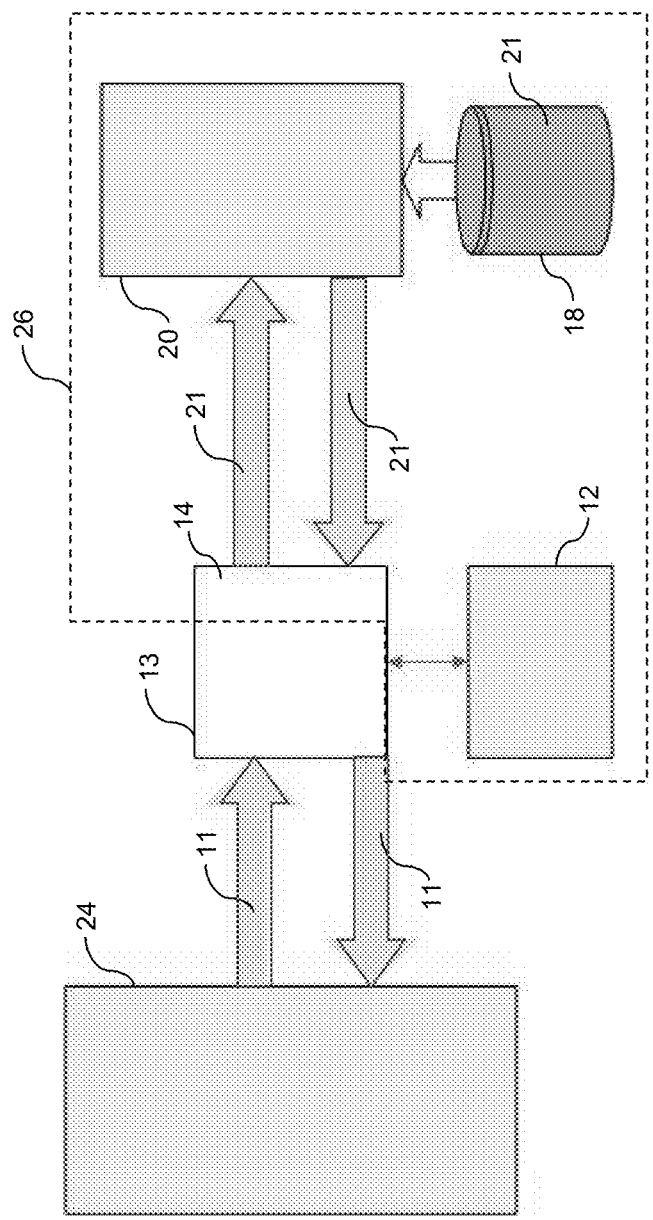
FIG. 3 is a schematic illustration of a transparent coupling configured for use as a proxy adapter.

Referring now to FIG. 3, shown is a schematic illustration of a transparent coupling 13 including a proxy adapter 14. Incoming protocol messages in the data flow coming into the proxy adapter 14 of the transparent coupling 13 match outgoing protocol messages so that the external entity 24 and the internal entity 20 can operate as if they were directly connected. The protection engine 12 is used to transform data used by the external entity 24 and the internal entity 20, such that the internal entity 20 only has protected data 21 available to it and data 21 within data domain 26 is in a protected or encrypted form, e.g., the data within the data domain 26 consists of protected data elements 21. As shown in FIG. 3, the proxy adapter 14 is a proxy mechanism which is inserted into a data flow as a proxy service between the external entity 24 and the internal entity 20 within domain 26 at the point where the data passes through the domain perimeter, to provide a transparent coupling 13. The proxy adapter 14 may provide a proxy service which may serve, for example, Hypertext Transfer Protocol (HTTP), either in insecure HTTP mode (HTTP) or in secure HTTP mode (HTTPS). The proxy service 14 may define the sensitive data elements by a mapping mechanism 60 (see FIG. 4) of form field names to domain schema elements, and further, may define sensitive data in the outgoing flow by a mapping mechanism 60 of HTTP division elements and ID attributes to domain schema elements, e.g., <div id="name">. . . </div>.

Figure 4:
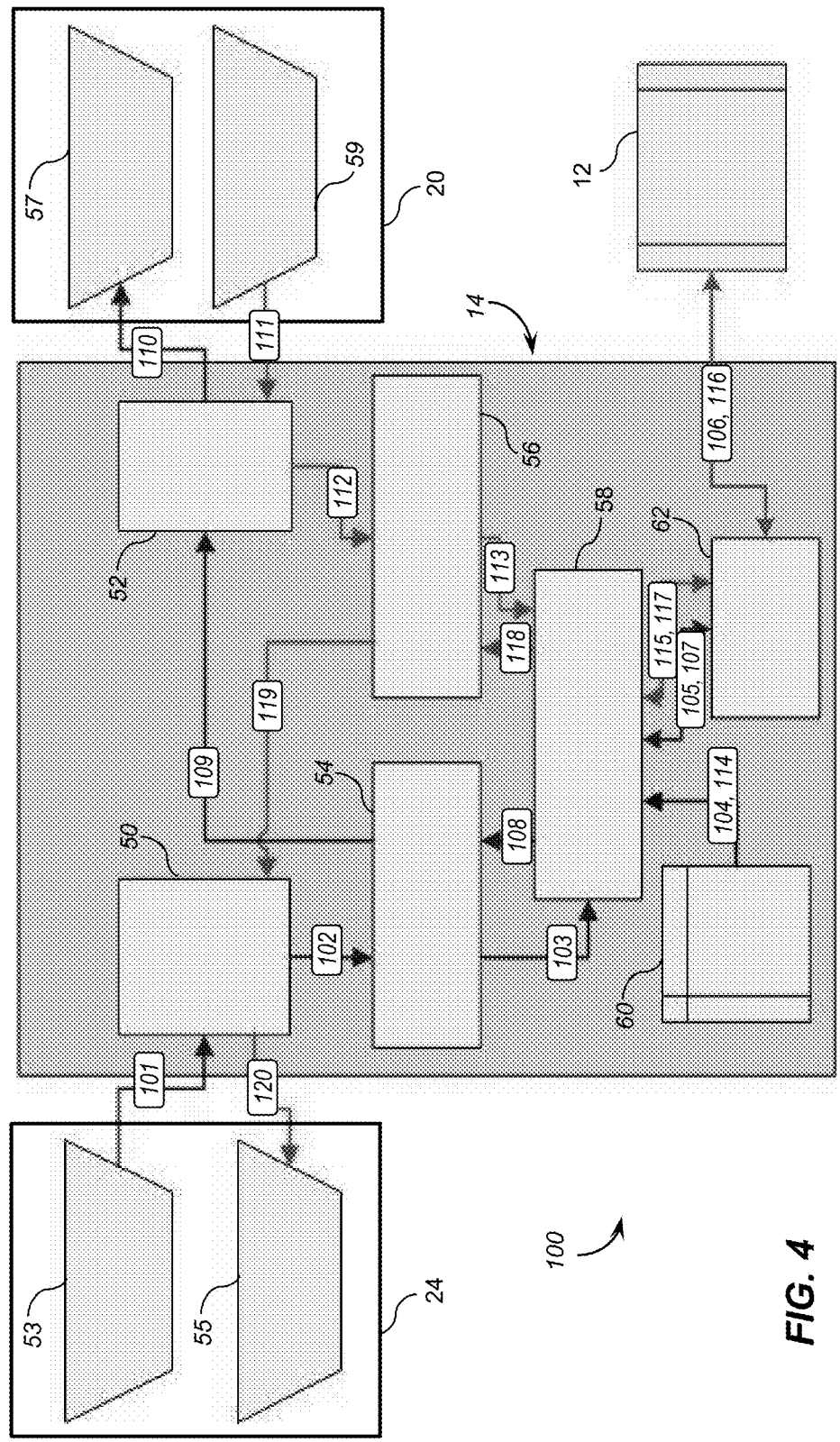
FIG. 4 is a schematic illustration of message flow using a system of format preserving encryption including a transparent coupling configured as a proxy service.

FIG. 4 shows one possible embodiment of the proxy adapter 14. In the non-limiting example configuration shown in FIG. 4, the proxy adapter 14 provides a process that exposes a responder for a well-defined messaging protocol and in turn makes requests using the same protocol. For each incoming request the proxy adapter 14 receives from either an internal entity 20 or an external entity 24, the proxy adapter 14 will make an outgoing request to the other entity after modifying the message contents such that sensitive data is protected by FPE while in the domain 26 and is presented in a decrypted or unprotected form, e.g., as one or more unprotected data elements 11 to the external entity 24. By using a proxy process there is no impact on either entity because the communication protocol is unaffected, e.g., from the point of view of either entity, the entities are directly connected to each other.

FIG. 4 shows a non-limiting example configuration of the proxy adapter 14 of FIG. 3. In the configuration shown, the proxy adapter 14 includes a listener mechanism 50 that accepts a request 53 from a requesting entity, which in the example shown is the external entity 24 and provides a response 55 from a responding entity, which in the example shown is the internal entity 20. The listener mechanism 50 is customized to handle the communication protocol related to the request 53 and the response 55. The proxy adapter 14 also includes a requester mechanism 52 that provides the request 57 to the responding entity 20 and receives a response 59 from the responding entity 20. The requester mechanism 52 is customized to handle the communication protocol related to the request 53 and the response 55. Not shown but understood, the proxy adapter 14 may be configured such that a listener mechanism 50 can receive a request from the internal entity 20, in which case the internal entity 20 is the requesting entity, and can provide a request to the external entity 24, in which case the external entity 24 is the responding entity.

As illustrated, FIG. 4 shows a listener mechanism 50 receiving a request 53 from the external entity 24, where the external entity 24 is shown as the requesting entity. The request 53 is provided, after transformation of the sensitive data elements to a protected form, to the internal entity 20, where the internal entity 20 is shown as the responding entity. The proxy adapter 14 further includes a message editor mechanism including a request message editor 54 and a response message editor 56. The message editor mechanisms 54, 56 parse the incoming request 53 (as shown in FIG. 4) or the incoming responses 55 (in the configuration wherein the internal entity 20 is the requesting entity and the external entity 24 is the responding entity) to extract unprotected sensitive data elements 11 (see FIG. 1) and map each sensitive data element 11 to a standard identifier for that data element in the domain data schema of the domain 26. The message editor mechanism is customized to handle the format of messages sent and received by the requesting and responding entities. The request message editor 54 and the response message editor 56 may be configured as separate mechanisms or may be configured as a shared message editor to handle both request and response messages.

The proxy adapter 14 also includes a data control mechanism 58, which receives fields from one or the other of message editors 54, 56 and determines what schema elements should be encrypted/decrypted for the ingoing/outgoing messages. This decision is configuration driven for each message and sensitive data element, which may include a mapping of form field names to domain schema elements. The data control mechanism 58 includes a data element mapping mechanism 60 which provides and stores the standard identifier specified for each sensitive data element. The proxy adapter 14 communicates with the protection engine 12 through the FPE client mechanism 62 using a secure protocol to encrypt or decrypt the sensitive data elements as required by the data control mechanism 58.

Generally indicated at 100, FIG. 4 illustrates a method of message flow using format preserving encryption according to the method and system shown in FIGS. 1 and 2 and a transparent coupling 13 including a proxy adapter 14. In the configuration shown, the external entity 24 is the requesting entity initiating a request 53, and the internal entity 20 is the responding entity providing a response 55. As would be understood, the proxy adapter 14 may be configured such that the internal entity 20 is the requesting entity and the external entity 24 is the responding entity.

Beginning with step 101, an external request 53 is made from the external entity 24 and is received by a listener mechanism 50 within the proxy adapter 14. The listener mechanism 50 passes the request message to a request message editor 54 at step 102. Continuing at step 103, the message editor 54 parses the request 53 and extracts and bundles the data elements, including the sensitive data elements, from the external request 53. A message editor 54 then passes the bundle of elements and the original message to the data control mechanism 58. At step 104, the data control mechanism 58 refers to the data element mapping 60 to determine the standard schema name for each sensitive data element included in the bundle, and at step 105, the data control mechanism 58 routes the unprotected sensitive data elements 11 and their standard names to the FPE client 62.

Continuing at step 106, the FPE client 62 makes a request 38 (see FIG. 2) to the protection engine 12, and in accordance with the method described for FIG. 2, receives back a protected or encrypted data element 21 for each of the sensitive data elements 11, where the encryption method used is C-FPE. At step 107, the FPE client 62 returns the encrypted data elements 21 to the data control mechanism 58. The data control mechanism 58, at step 108, routes the bundle of data elements with the unprotected sensitive elements 11 now replaced by encrypted elements 21, plus the original message (request) 53 to the request message editor 54.

At step 109, the request message editor 54 reconstitutes the original message (request) 53, substituting protected or encrypted elements 21 for the original sensitive data 11 and passes the reconstituted request 57 to the requester mechanism 52. The requester mechanism 52, at step 110, provides the request 57, including the protected sensitive data elements 21, to the internal entity 20. At step 111, the internal entity 20 processes the request 57, and prepares a response 59 which may include one or more protected sensitive data elements 21. The response 59 is reconstituted using steps 112 through 120, and a reconstituted response 55, including sensitive data elements which have been unprotected by the proxy adapter 14, is transmitted back to the requester, e.g., to the external entity 24. Steps 112 through 120 perform the same operations as steps 102 through 110, but now operate on the response message 59 instead of the request message, using the response message editor 56 to perform the functions performed by the request message editor 54 in steps 102 through 110, which may include unprotecting or decrypting sensitive data elements in the response message 59 to provide a reconstituted response 55 including the unprotected data elements 11. As discussed previously, the request message editor 54 and the response editor 56 may be configured as a shared mechanism. At step 116, the FPE client 62 makes a request to the protection engine 12 to decrypt the response 59 such that the response message editor 56 can substitute decrypted data elements 11 for the sensitive elements in response 59 to provide a reconstituted response 55, before returning the response 55 at step 119 to the listener mechanism 50, which returns the response 55 including the decrypted data elements to the external entity 24 at step 120.

Figure 5:
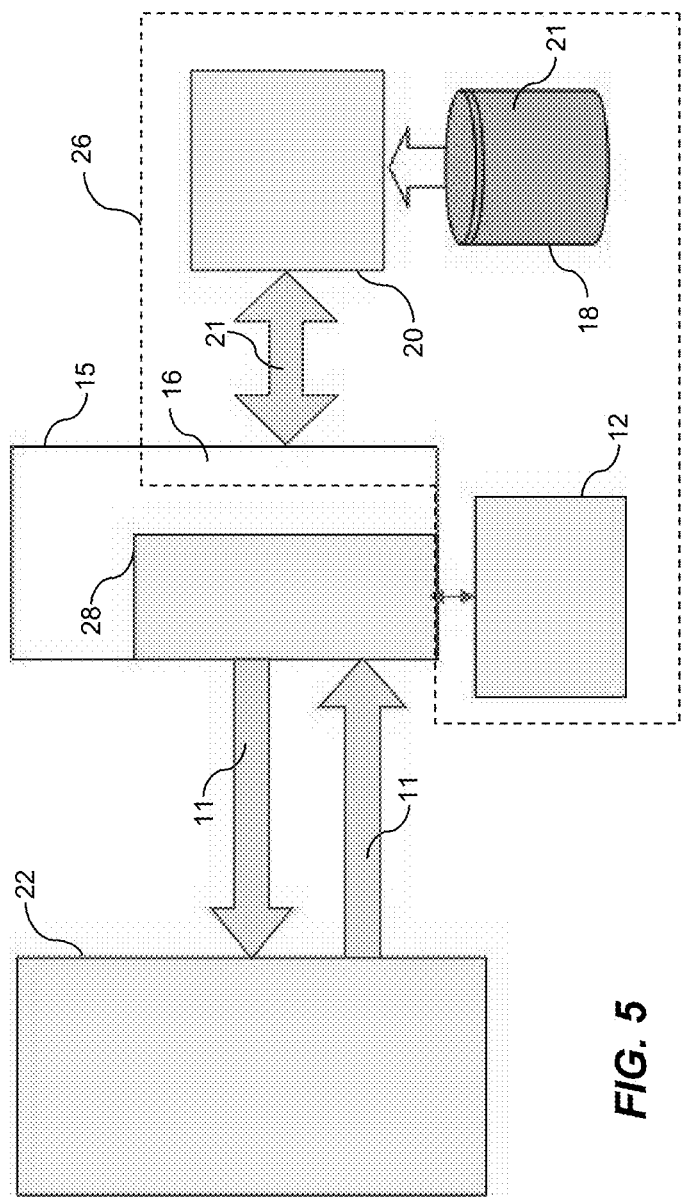
FIG. 5 is a schematic illustration of an API communicating with an external entity through a transparent coupling configured for use as a shim API adapter.

FIG. 5 shows a schematic illustration of an API 28 communicating with an external entity 22 using the system and method disclosed herein, e.g., the data flows through a transparent coupling 15 including a shim API adapter 16, where sensitive elements of the data are protected within the data domain 26 using C-FPE. As shown in FIG. 5, the internal entity 20 calls the shim API adapter 16 in the same manner the internal entity 20 would call the external API 28. As shown in FIG. 5, the internal entity 20 only has protected data 21 available to it. The protection engine 12 is used by the transparent coupling 15 including the shim API 16 to transform the encrypted data as required by the external API 28. The API 28 may be, for example, a payment services API.

The API shim adapter 16 functions as a wrapper around the API 28 which exposes an interface to the internal entity 20 which is the same as the interface of the API 28. Adapters of the type similar to the API shim adapter 16 are useful mainly when sensitive data must be transferred from inside a domain 26 to an external entity 22 when the domain process is using an API 28 provided by the external entity 22 to communicate with that external entity 22. The shim adapter 16 stands in for the external API 28, so the domain process will invoke the shim adapter 16 in the same manner as the domain process would invoke the external API 28. The shim adapter 16 processes the sensitive data elements according to the methods described herein, such that the sensitive data elements are protected by FPE as protected data elements 21 while in the domain 26, and are presented as unprotected or decrypted data elements 11 to the external API 28. The shim adapter 16 then calls the original API 28. By using the shim API 16 there is little impact on the domain entity 20, e.g., the entity 20 needs only to change its linkage from the external API 28 to the shim 16. Also, there is no impact on the external entity 22 because it continues to interface with the external API 28, where the API 28 ultimately is used to manage the interaction.

Figure 6:
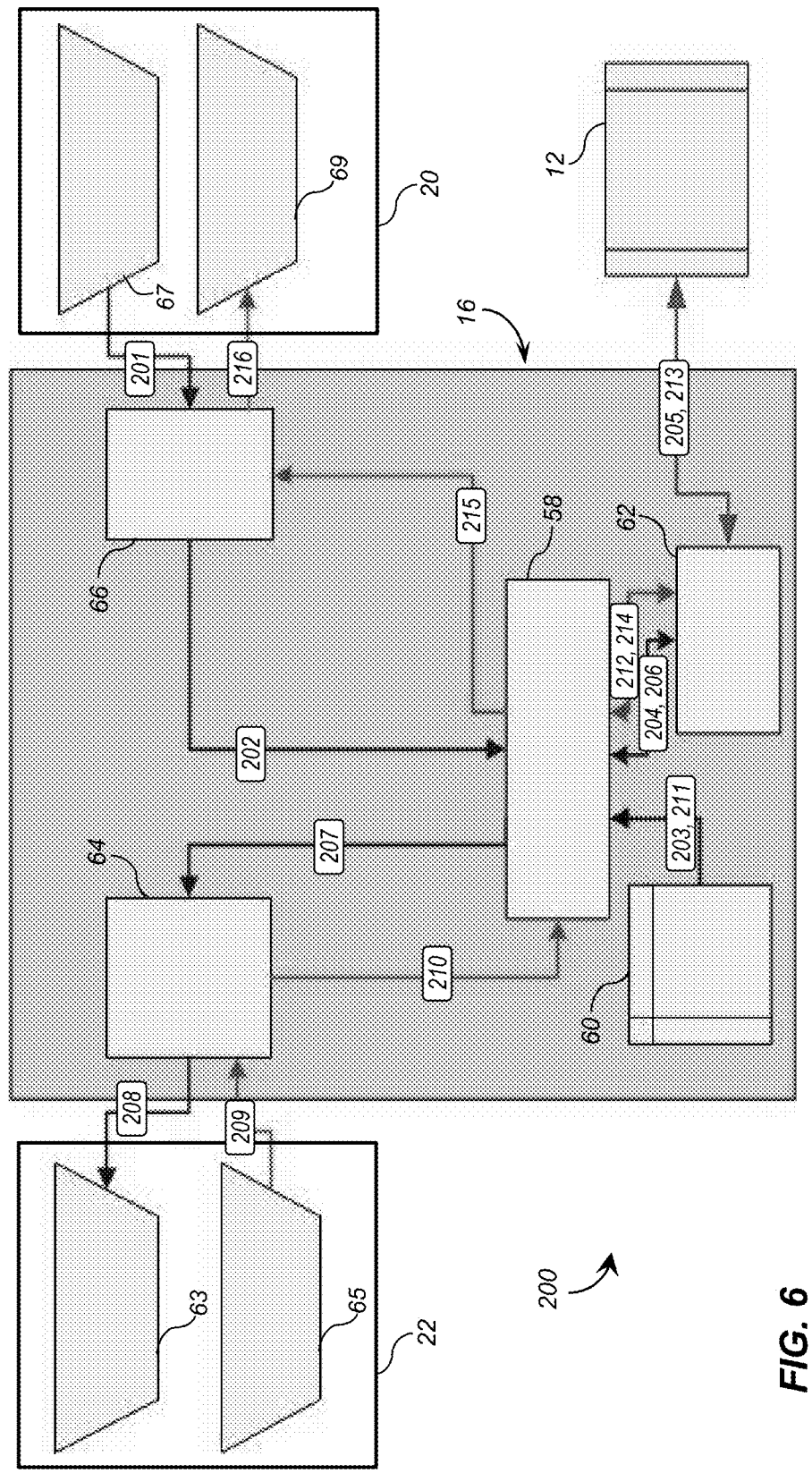
FIG. 6 is a schematic illustration of message flow using a system of format preserving encryption including a transparent coupling configured as a shim API.

FIG. 6 shows one possible embodiment of the shim API adapter 16. In the non-limiting example configuration shown in FIG. 6, the shim API adapter 16 includes a marshalling mechanism 66 that accepts API calls 67 and constructs return elements which are included in a response 69. A marshalling mechanism 66 is customized so that it exposes the same interface as the underlying or external API 28 (see FIG. 5). The shim API adapter 16 further includes a requester mechanism 64 that composes API calls 63 to the external entity 22 and parses responses 65 it receives from the remote or external entity 22. The requester mechanism 64 is also customized to use and interface to the underlying API 28 (see FIG. 5).

The shim API adapter 16 includes a data control mechanism 58 that receives data fields from the marshalling mechanism 66 and determines what schema elements should be encrypted/decrypted for ingoing/outgoing calls, e.g., the marshalling mechanism 66 determines which schema elements are sensitive and require protection within the domain 26. This decision is configuration driven. The data control mechanism 58 refers to the data element mapping mechanism 60, which provides and stores the standard identifier specified for each sensitive data element. The data control mechanism 58 communicates with an FPE client mechanism 62, which communicates with the protection engine 12 using a secure well-defined protocol to encrypt or decrypt the sensitive data elements as determined and required by the data control mechanism 58.

Generally indicated at 200, FIG. 6 illustrates a method of message flow using format preserving encryption according to the method and system shown in FIGS. 1 and 2 and a transparent coupling 15 including a shim API adapter 16. Beginning with step 201, an API call 67 is made by the internal entity 20 to communicate with an external entity 22. API call 67 is received and handled by a marshalling mechanism 66. The marshalling mechanism 66 extracts and bundles data elements from call 67, and at step 202 passes the bundle of elements and the original call details to the data control mechanism 58.

At step 203, the data control mechanism 58 refers to the data element mapping 60 to determine what the standard schema name is for each sensitive data element received in the bundle extracted from the API call 67. At step 204, the data control mechanism 58 routes the sensitive data elements and the standard name for each sensitive data element obtained from the data element mapping 60 to the FPE client 62. At step 205, the FPE client 62 makes a request 38 (see FIG. 2) to the protection engine 12 to decrypt the protected sensitive data elements 21 according to their respective standard schema names and receives back the decrypted, e.g., unprotected data elements 11. At step 206, the FPE client 62 returns the decrypted elements 11 to the data control mechanism 58. At step 207, the data control mechanism 58 routes the bundle of data elements with the sensitive elements replaced by decrypted elements 11, plus the original call details to the requester mechanism 64.

Continuing at step 208, the requester mechanism 64 makes a reconstituted API call 63 using the external API 28 (see FIG. 5). The reconstituted API call 63 includes the original call details of API call 67 plus the bundle of data elements with the sensitive elements replaced by decrypted elements 11. The external entity 22 processes the API call 63, and in step 209 the result of the call is returned as a response 65 to the requester mechanism 64. The result may be a simple response code or a package of data.

Steps 210 through 216 perform the same operations as steps 202 through 208, now operating on the response data 65, such that at step 213, the FPE client 62 makes a request 38 (see FIG. 2) to the protection engine 12 to encrypt the sensitive data elements in the response 65, and receives back FPE encrypted data elements 21. Steps 214 through 216 are completed to return a reconstituted response 69 to the internal entity 20. By using the FPE process on the response data, the internal entity 20 receives back a recognizable response 69 to its API call 67, however response 69 contains only encrypted data 21 for the sensitive elements, thereby protecting the sensitive data within the domain 26.

Referring to FIGS. 1, 4 and 6, it is understood that each of the data control mechanism 58, the data element mapping 60 and the FPE client 62 may be configured the same or similarly as included in the proxy adapter 14 and the shim API adapter 16. The C-FPE system 10 may be configured such that one or more of elements 58, 60 and 62 are shared by the transparent couplings 13, 15 including these adapters. In alternate configurations, each adapter 14, 16 may include a data control mechanism, a data element mapping or a FPE client which has been customized for that adapter and coupling.

While the best modes for carrying out the invention have been described in detail, those familiar with the art to which this invention relates will recognize various alternative designs and embodiments for practicing the invention within the scope of the appended claims.

The invention claimed is:

1. A method of protecting a sensitive data element within a domain, the method comprising:
    inserting a transparent coupling into a data flow at a perimeter of the domain, wherein the data flow through the transparent coupling includes the sensitive data element; and
    translating the sensitive data element from an unprotected data element to a protected data element using the transparent coupling such that the sensitive data element is configured as the protected data element within the domain;
    encrypting the sensitive data element using an encryption mechanism that preserves the syntax, internal semantics and coherence of the unprotected data element of the sensitive data element after translation to the protected form, wherein the protected data element includes an encrypted element;
    using one or more secret keys to encrypt the sensitive data element;
    wherein encrypting the sensitive data element includes consistently encrypting the sensitive data element to a corresponding encrypted element which is substantially the same each time the corresponding sensitive data element is encrypted; and
    producing the corresponding sensitive data element using the corresponding encrypted element and the one or more secret keys.

2. The method of claim 1, further comprising:
    protecting access to the one or more secret keys using a central server.

3. The method of claim 2, wherein protecting access to the one or more secret keys further comprises:
    protecting access to the central server with an authentication mechanism.

4. The method of claim 3, wherein the authentication mechanism includes at least one of a cryptographic camouflage, a one-time password, a Remote Authentication Dial In User Service (RADIUS) protocol, and a single sign-on/trust delegation mechanism.

5. The method of claim 1, further comprising:
    inserting an additional transparent coupling into the data flow at the perimeter of the domain, wherein the data flow through the additional transparent coupling includes an additional data element;
    wherein the data flow through the transparent coupling and the data flow through the additional transparent coupling each includes the sensitive data element; and
    consistently translating the sensitive data element from an unprotected element to a corresponding protected element when the sensitive data element is included in the data flow through the transparent coupling and when the sensitive data element is included in the data flow through the additional transparent coupling.

6. The method of claim 1,
    wherein translating the sensitive data element from the unprotected data element into the protected data element further comprises:
    representing the sensitive data element with a corresponding token using a token mapping mechanism, wherein the corresponding token is a randomly generated token;
    preserving the syntax and internal semantics of the sensitive data element in the corresponding token;
    consistently representing the sensitive data element as the corresponding token each time the sensitive data element is translated; and
    producing the sensitive data element using the corresponding token and the token mapping mechanism.

7. The method of claim 6, further comprising:
    protecting access to the token mapping mechanism using a central server.

8. The method of claim 7, wherein protecting access to the token mapping mechanism further comprises:
    protecting access to the central server with an authentication mechanism;
    wherein the authentication mechanism includes at least one of a cryptographic camouflage, a one time password, a Remote Authentication Dial In User Service (RADIUS) protocol, and a single sign-on/trust delegation mechanism.

9. The method of claim 1, wherein the data flow includes protocol messages, further comprising:
    configuring the transparent coupling as a proxy service;
    identifying the sensitive data element in the protocol messages using the proxy service;
    translating the sensitive data element from the unprotected data element to the protected data element using the proxy service; and
    replacing the unprotected data element of the sensitive data element in the protocol messages with the protected data element of the sensitive data element using the proxy service.

10. The method of claim 9, wherein the proxy service serves one of HTTP protocol and HTTPS protocol.

11. The method of claim 9, further comprising:
    defining the sensitive data element by a mapping of form field names to domain schema elements.

12. The method of claim 9, further comprising:
    defining the sensitive data element by a mapping of HTTP division elements and ID attributes to domain schema elements.

13. The method of claim 1, wherein an API is used by a process within the domain to move data elements into or out of the domain, the method further comprising:
    configuring the transparent coupling as a shim API;

replacing the API used by the process within the domain with the shim API without making coding changes in the caller of the API;

identifying the sensitive data element from input arguments, output arguments, input messages and output messages moved into or out of the domain using the shim API;

translating the sensitive data element from an unprotected data element to a protected data element using the shim API; and replacing the unprotected data element of the sensitive data element in the input arguments, output arguments, input messages and output messages with the protected data element of the sensitive data element using the shim API.

14. A system for protecting a sensitive data element within a domain, the system comprising:

a domain including a server configured to receive a sensitive data element;

the server including a tangible non-transitory memory device;

a data flow at a perimeter of the domain, wherein the data flow includes the sensitive data element;

a transparent coupling inserted into the data flow at the perimeter and configured to translate the sensitive data element from an unprotected data element to a protected data element such that the sensitive data element is configured as the protected data element when the sensitive data element is within the domain;

wherein the transparent coupling is configured as a shim API;

wherein the shim API is configured to replace an API used by a process within the domain without making coding changes in the caller of the API;

wherein the shim API is configured to identify the sensitive data element from one or more input arguments, output arguments, input messages and output messages moved into or out of the domain and to replace the unprotected data element of the sensitive data element in the one or more input arguments, output arguments, input messages and output messages with the protected data element of the sensitive data element.

15. The system of claim 14, further comprising:

a protection engine, wherein the protection engine includes:

an access control mechanism configured to authorize fulfillment of a data request; and an encryption mechanism configured to translate the sensitive data element from the unprotected data element to the protected data element, wherein the protected data element defines an encrypted data element which preserves the syntax and internal semantics of the unprotected data element.

16. The system of claim 14, further comprising:

a token mapping mechanism, wherein the token mapping mechanism is configured to translate the sensitive data element from the unprotected data element to the protected data element, wherein the protected data element defines a token which preserves the syntax and internal semantics of the unprotected data element.

17. The system of claim 14, wherein the transparent coupling is configured as a proxy service;

wherein the proxy service is configured to identify the sensitive data element in a protocol message and to replace the unprotected sensitive data element with the protected sensitive data element.

18. A method of protecting a sensitive data element within a domain, the method comprising:

inserting a transparent coupling into a data flow at a perimeter of the domain, wherein the data flow through the transparent coupling includes the sensitive data element; and translating the sensitive data element from an unprotected data element to a protected data element using the transparent coupling such that the sensitive data element is configured as the protected data element within the domain;

wherein translating the sensitive data element from the unprotected data element into the protected data element further comprises:

representing the sensitive data element with a corresponding token using a token mapping mechanism, wherein the corresponding token is a randomly generated token;

preserving the syntax and internal semantics of the sensitive data element in the corresponding token;

consistently representing the sensitive data element as the corresponding token each time the sensitive data element is translated; and producing the sensitive data element using the corresponding token and the token mapping mechanism.

19. The method of claim 18, further comprising:

protecting access to the token mapping mechanism using a central server.

20. The method of claim 19, wherein protecting access to the token mapping mechanism further comprises:

protecting access to the central server with an authentication mechanism;

wherein the authentication mechanism includes at least one of a cryptographic camouflage, a one time password, a Remote Authentication Dial In User Service (RADIUS) protocol, and a single sign-on/trust delegation mechanism.

* * * * *